United States Patent [19]

Nishizawa et al.

[11] Patent Number: 5,160,168
[45] Date of Patent: Nov. 3, 1992

[54] PRETENSIONER FOR A VEHICLE SAFETY BELT SYSTEM

[75] Inventors: Muneo Nishizawa; Hideaki Yano, both of Shiga, Japan

[73] Assignee: Takata Corporation, Tokyo, Japan

[21] Appl. No.: 661,059

[22] Filed: Feb. 25, 1991

[30] Foreign Application Priority Data

Mar. 1, 1990 [JP] Japan ................... 2-50441

[51] Int. Cl.⁵ ............................................ B60R 22/46
[52] U.S. Cl. ................................... 280/806; 280/807; 297/480
[58] Field of Search ............... 280/801, 802, 806, 807; 297/480, 478; 242/107, 107.12; 267/167, 155

[56] References Cited

U.S. PATENT DOCUMENTS

| | | | |
|---|---|---|---|
| 2,043,152 | 6/1936 | Cook | 267/155 |
| 2,701,693 | 2/1955 | Nordmark et al. | 297/480 X |
| 3,126,072 | 3/1964 | Johansson | 267/155 |
| 3,405,953 | 10/1968 | Karlsson | 297/478 |
| 3,606,455 | 9/1971 | Carter | 280/807 X |
| 3,758,044 | 9/1973 | Nilsson | 297/478 |
| 5,039,127 | 8/1991 | Föhl | 280/806 |

OTHER PUBLICATIONS

Skole, Robert, "New Auto Safety Harness Shows Way to Set Standards", Product Engineering, Apr. 24, 1967, pp. 94-96.

Primary Examiner—Charles A. Marmor
Assistant Examiner—Tamara L. Graysay
Attorney, Agent, or Firm—Brumbaugh, Graves, Donohue & Raymond

[57] ABSTRACT

A pretensioner for a vehicle safety belt system adapted to tighten a webbing that restrains a vehicle occupant by displacing an element of the belt system in a manner such as to tighten the webbing comprises, as the motive power source for displacing the element, a torsion coil spring having a base end portion fixed to the vehicle, a coil portion retained in guided relation to the vehicle, and an operating end portion associated with the element such as to impart a driving force to the element to cause it to displace upon release of energy stored in the coil spring. The element of the belt system displaced by the torsion coil spring may be a portion of the restraint webbing itself or of a webbing associated with the restraint webbing or a buckle by which the webbing is attached to the vehicle.

8 Claims, 8 Drawing Sheets

PRETENSIONER FOR A VEHICLE SAFETY BELT SYSTEM

DESCRIPTION

Background of the Invention

The present invention relates to vehicle safety belt systems and, more particularly, to a pretensioner for tightening the webbing of the belt system that restrains the occupant so that the webbing holds him or her more securely in the event of a collision.

In order to minimize the movement of a vehicle occupant's body due to inertia in a collision of the vehicle and thereby prevent a secondary collision between the occupant and a part of the vehicle, the webbing of the safety belt system should firmly engage the body at all times. Many people, however, dislike the pressure of the webbing against the body and prefer to have it somewhat loosely fitted so that it is more comfortable, allows freedom to change sitting posture to some degree and reduces fatigue. As a result, the occupant is often not well-protected in the event of a collision, because the looseness of the belt at the moment of a collision means that the occupant's body can be thrown forward a greater distance that it would be if the webbing were tightly fitted.

The objectives of making the webbing comfortable to the occupant by enabling it to be loosely fitted to the body and at the same time preventing excessive movement of the body in a collision can be attained by the use of a pretensioner for the webbing. A number of types of pretensioners have been proposed. Common to all of them is a motive power source that operates virtually instantaneously on an element of the belt system to displace the element in such a way as to tighten the webbing. Suitable known motive power sources for pretensioners are piston/cylinders, in which the piston is moved by gas pressure generated by a fast-burning or explosive substance, such as gunpowder (Japanese Provisional Patent Publication No. 57-57565), mechanisms based on compression coil springs (Japanese Provisional Patent Publication No. 58-33060), and mechanisms employing torsion bar springs (Japanese Provisional Patent Publication No. 61-241234). Those known power sources have various disadvantages. Those that use gunpowder are expensive, require an electric sensor to ignite the gunpowder and have to be removed before the vehicle is scrapped. Those that use compression coil springs and torsion bar springs take up a lot of space due to the length of the spring and, therefore, present problems in the design of the vehicle to accommodate them.

SUMMARY OF THE INVENTION

An object of the present invention is to provide a motive power source for a webbing pretensioner for a vehicle safety belt system that is of relatively low cost. Another object is to provide a motive power source for a pretensioner that occupies a small space, which makes it possible to install it conveniently in various locations in the vehicle and to use it in conjunction with various elements of the belt system. The foregoing objects are attained, according to the present invention, by a pretensioner that is characterized in that the motive power source is a torsion coil spring having a base end portion fixed to the vehicle, a coil portion retained in guided relation to the vehicle, and an operating end portion associated with an element of the belt system such as to impart a driving force to the element to cause it to displace upon release of energy stored in the coil spring.

The element of the belt system that the torsion coil spring displaces may in some embodiments be a portion of a webbing, either the restraint webbing itself or a webbing associated with the restraint webbing. In such embodiments, the invention is further characterized in that the coil portion of the coil spring is positioned laterally adjacent the webbing portion with its axis disposed substantially crosswise with respect to the webbing portion. In preferred forms of such embodiments, there are two coil springs, one positioned on one side of the webbing portion and the other on the other side of the webbing portion. The operating end portions of the two coil springs may be connected to each other. For example, the operating portions of the two coil springs may be unitary, the two coil springs being portions of an integral coil spring member.

In other embodiments of the invention, the element of the belt system that is displaced by the torsion coil spring is a buckle by which a portion of the webbing is releasably attached to the vehicle. In some forms of such embodiments, a mandrel is rotatably supported on the vehicle, the buckle is connected to the mandrel by a flexible member, and the operating end portion of the coil spring is connected to the mandrel such as to rotate it upon release of the energy stored in the coil spring and wind the flexible member onto the mandrel, whereby the buckle is displaced to tighten the webbing.

In all embodiments of the invention, it is advantageous to use a torsion coil spring in which in at least the coil portion the spring material has a transverse cross-section in which with respect to the coil axis the radial thickness is substantially greater than the axial width. Such a form of coil spring provides as high force but occupies a small space, which facilitates fitting it into the vehicle.

In the operation of a pretensioner according to the present invention, the operating end portion of the torsion coil spring transmits a driving force to an element of the safety belt system upon release of the energy stored in it such as to displace that element in a way that causes the webbing to be tightened. When the element acted upon is a portion of the webbing itself, which is preferably accomplished by displacing the webbing transversely to the direction in which it normally extends, the webbing is directly tightened and placed under a certain pretension. When torsion coil springs are provided on both sides of the webbing, the forces exerted on the webbing are evenly distributed across the width of the webbing.

The use of a torsion coil spring in a pretensioner, according to the present invention, to displace a buckle provides, in the most common forms of belt system, pretensioning of both the lap and shoulder portions of the webbing. In particular, the most widely used belt systems have a webbing that runs from a anchor adjacent the rear, outboard side of the seat, through a buckle tongue, which is fastened releasably to a buckle adjacent the inboard side of the seat, upwardly and outwardly across the seat to an anchor above and behind the outboard side of the seat back and finally to a retractor. By displacing the buckle, both the shoulder and lap portions of the webbing are tightened. Winding a flexible member, by which the buckle is attached to the vehicle, onto a mandrel has the advantage of pulling the buckle in a direction to tighten the webbing by a force that acts in the pulling direction, rather than transverse to that direction.

For a better understanding of the invention, reference may be made to the following description of exemplary embodiments, taken in conjunction with the accompanying drawings.

DESCRIPTION OF THE EMBODIMENTS

In the first embodiment (FIGS. 1 to 4) the pretensioner P is arranged to act directly on a webbing of a safety belt system by displacing a portion of the webbing W adjacent a retractor R. The pretensioner is incorporated into the same base frame F as the retractor R and has a torsion coil spring 1 as the motive power means for displacing the webbing in a manner such as to pretension it. The spring 1 comprises a base end portion 1a, a coil portion 1b and an operating end portion 1c.

Figure 1:
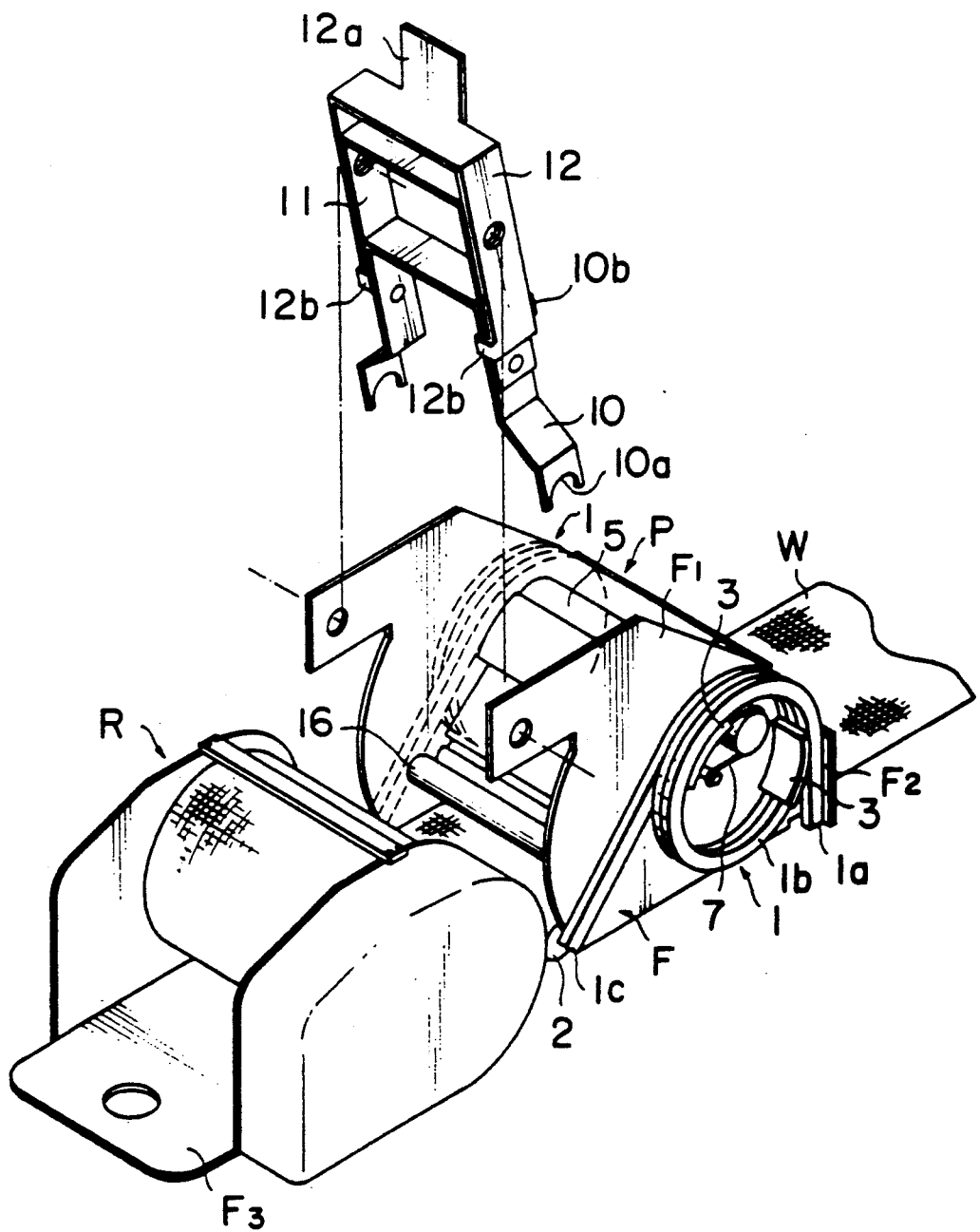
FIG. 1 is an exploded pictorial view of a first embodiment.

In FIG. 1, the spring 1 is shown in its "set" position, in which energy is stored by tightening of the coil portion 1b. The base end portion 1a extends away from the coil portion 1b in a tangential direction and engages a lug F2 that projects laterally outwardly from the frame side portion F1. The coil portion 1b is supported on the frame side F1 by lugs 3. The operating end portion 1c extends tangentially toward the retractor and the base F3 of the frame F. The arrangement shown in the foreground in FIG. 1 is duplicated by a second torsion coil spring 1 on the opposite side of the frame, and the operating end portions of the two coil springs 1 are joined by a segment of the spring 1 that extends transversely across the frame F between the base F3 and the normal path of the webbing W. In the embodiment, the two springs are parts of a unitary spring member, the operating portions 1c being united by an integral transverse portion. A cylindrical sleeve 2 fits over the segment of the spring member that extends across the frame F.

Figure 2:
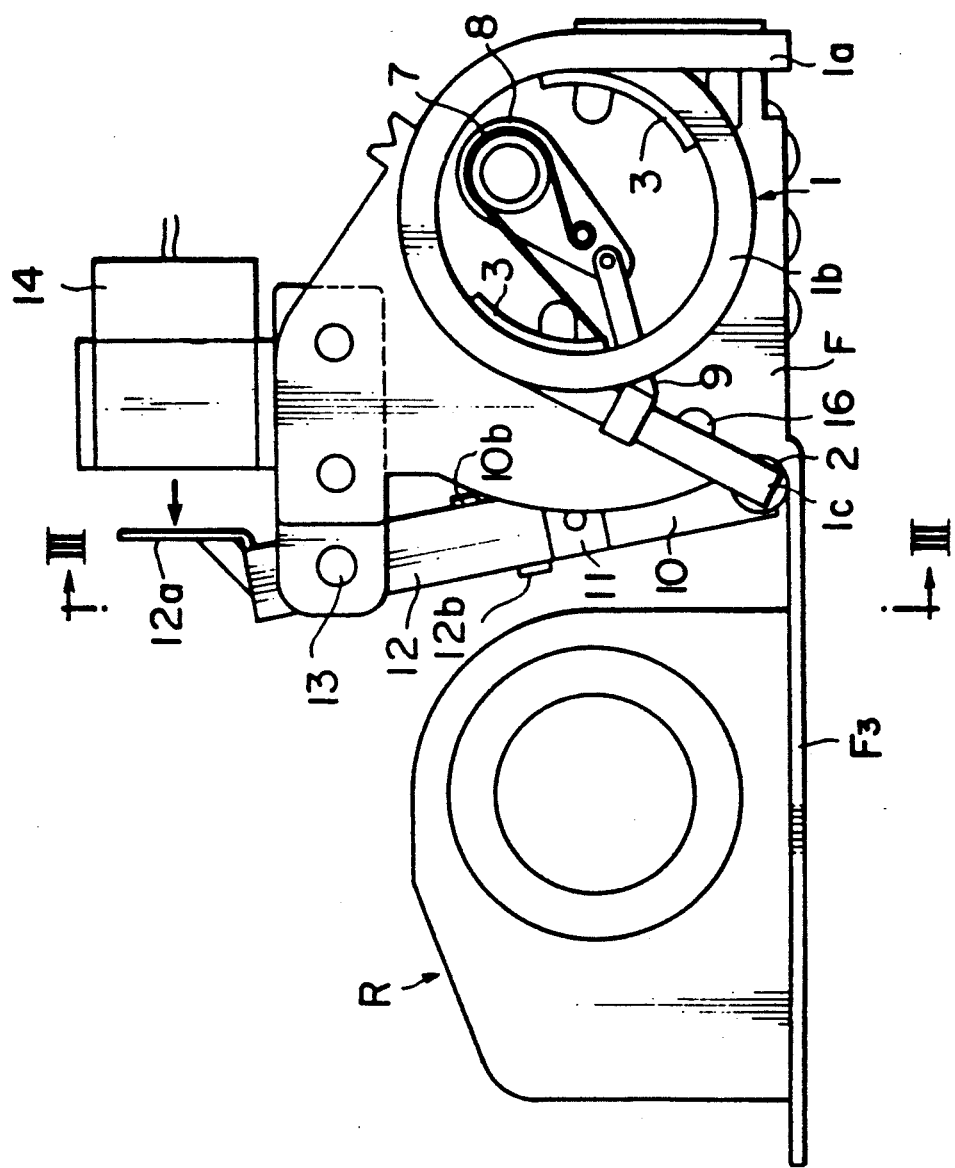
FIG. 2 is a side elevational view of the first embodiment.
Figure 3:
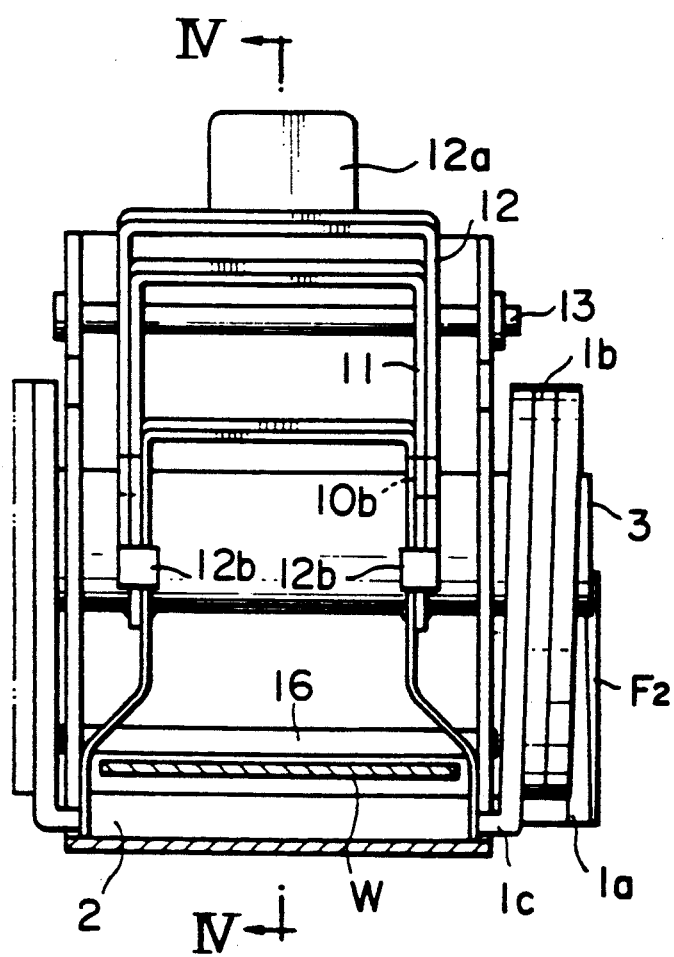
FIG. 3 is a cross-sectional view of the first embodiment taken along the lines 3—3 of FIG. 2.
Figure 4:
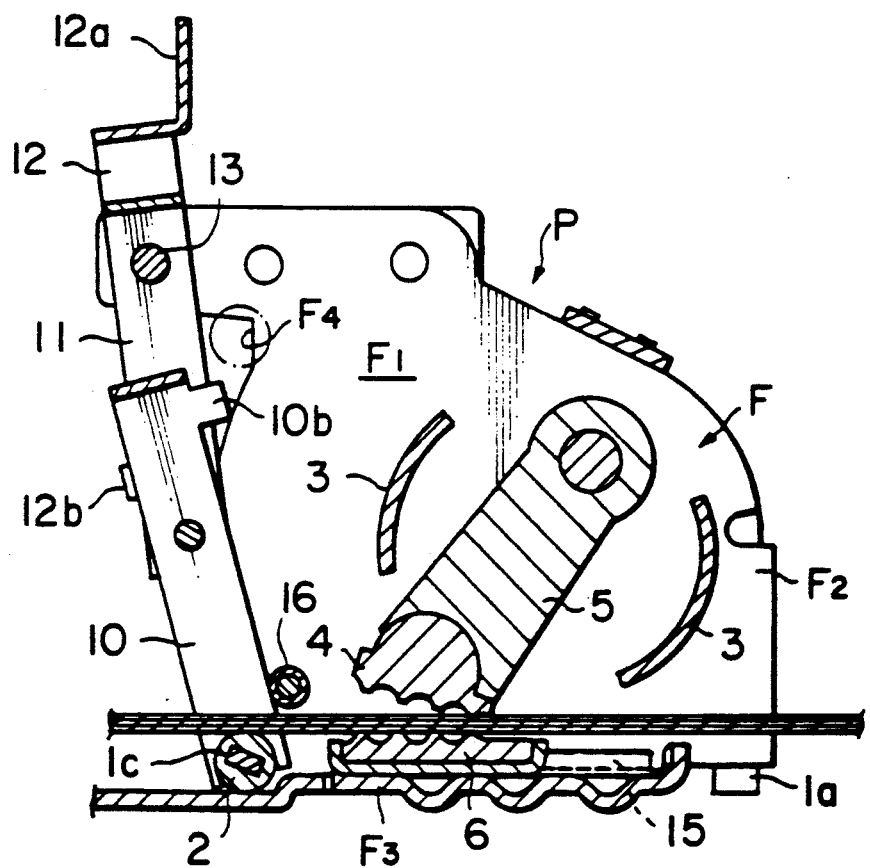
FIG. 4 is a cross-sectional view of the first embodiment taken along the lines 4—4 of FIG. 3.

A clamp lever arm 5 having a clamp jaw 4 pivotally mounted at its free end is located between the frame sides F1 and is affixed to a shaft that extends across the frame F and is pivotally mounted in the frame sides F1. Mounted for sliding movement lengthwise with respect to the webbing W on the frame base F3 in opposed relation to the clamp jaw 4 and on the opposite side of the webbing is a clamp jaw 6, which is biased by a spring 15 in a direction toward the retractor R. As shown in FIG. 2 (but not shown in FIG. 1), a holder arm 8 is affixed to the shaft of the clamp lever arm 5 and is also coupled to the lever arm 5 by a linking pin that passes through a slot in the frame side F1. The holder arm and lever arm are biased counterclockwise (with respect to FIG. 2) by a spring 7, one end of which bears against the lug 3 and the other end of which fits onto the linking pin. Normally, the holder arm and lever arm are kept from rotating under the bias of the spring 7 by a holder link 9, and the webbing is free to pass between the clamp jaws 4 and 6 in this condition.

A trigger mechanism for the pretensioner is mounted on the portions of the frame sides F1 proximate to the retractor R. The trigger mechanism includes a toggle linkage composed of two U-shaped link members 10 and 11 that are pivotally joined to each other by rivets or the like and an operating link member 12. The link members 11 and 12 are pivotally mounted on the frame sides F1 by an axle 13. In the set position, the toggle linkage is in the toggle position shown in FIG. 4, in which the linkage holds the operating end portions 1c of torsion coil springs 1 in their energy-storing state by engagement of notches 10a in the lower ends of the legs of the lower link member 10 with the sleeve 2. Lugs 10b on the legs of the link member 10 establish the toggle position by preventing the link members 10 and 11 from pivoting from the slightly articulated position shown in FIG. 4.

In the event of a collision, an acceleration sensor (not shown) causes an electrical signal to be supplied to a trigger device 14 of the type that uses gunpowder to produce a pressure wave (see FIG. 2). The pressure wave impinges on an arm 12a of the link member 12, as represented by the arrow in FIG. 2. Lugs 12b on the link member act against the toggle link members 10 and 11, causing the toggle position to be undone and permitting the linkage to articulate about the pivot connection between the members 10 and 11 under the force applied when the energy stored in the torsion coil spring is transduced into motion of the operating end portion 1c of the spring. The motion is stopped by engagement of the operating portion 1c with a stop recess F4 on the side wall F1 of the frame. At the beginning of the release of the spring force and movement of the operating end portion 1c, the holder link 9 is destroyed, thereby enabling the spring 7 to pivot the lever arm 5 in a direction to engage the clamp jaw 4 with the belt. Under the force of the torsion coil spring 1, the webbing W is deflected transversely to its normal path from the retractor R, forming a loop between the retractor reel and a guide bar 16. The formation of the loop pulls the webbing firmly against the vehicle occupant and pretensions the webbing. The pretensioned condition is held by clamping of the webbing against pulling out by its engagement between the clamp jaws.

The pretensioner of FIGS. 1 to 4 occupies only a relatively small space. In this regard, the coil portions 1b of the springs 1 are formed of a material having a cross-section that is wider in the radial direction, with respect to the coil axis, and narrower in the axial direction, which minimizes the dimension transversely of the webbing. The provision of springs 1 on both sides of the webbing provides even distribution of the spring forces on the webbing.

Figure 5:
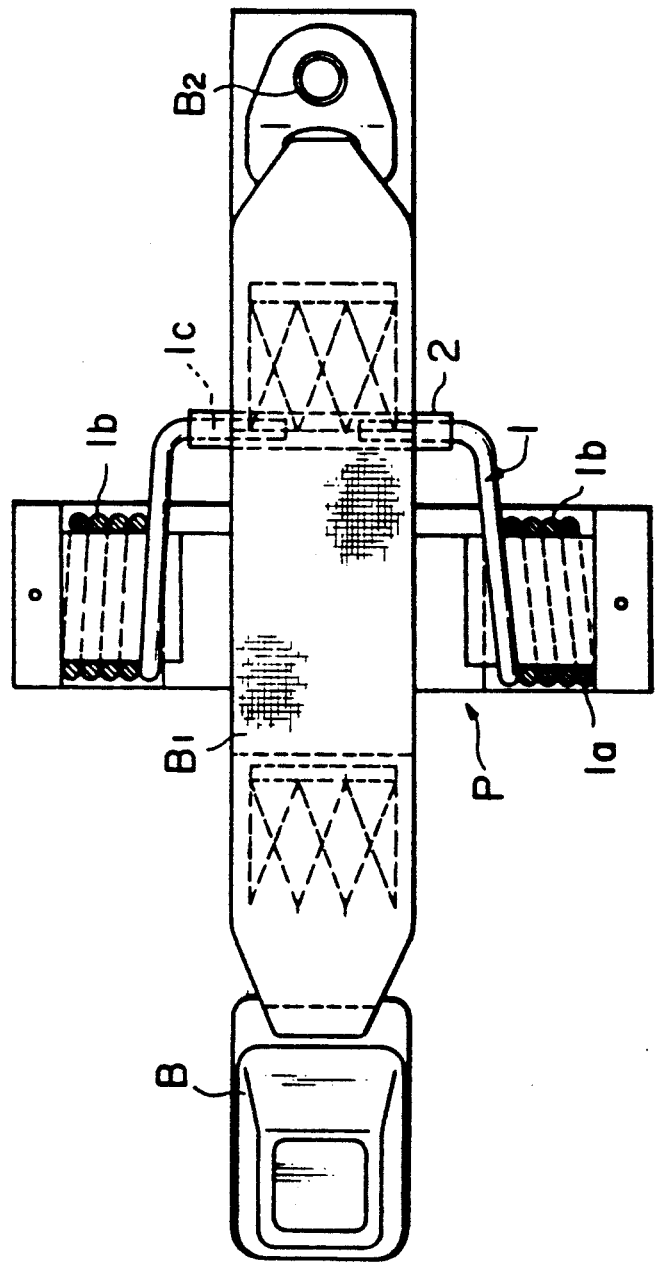
FIG. 5 is a top plan view of a second embodiment.
Figure 6:
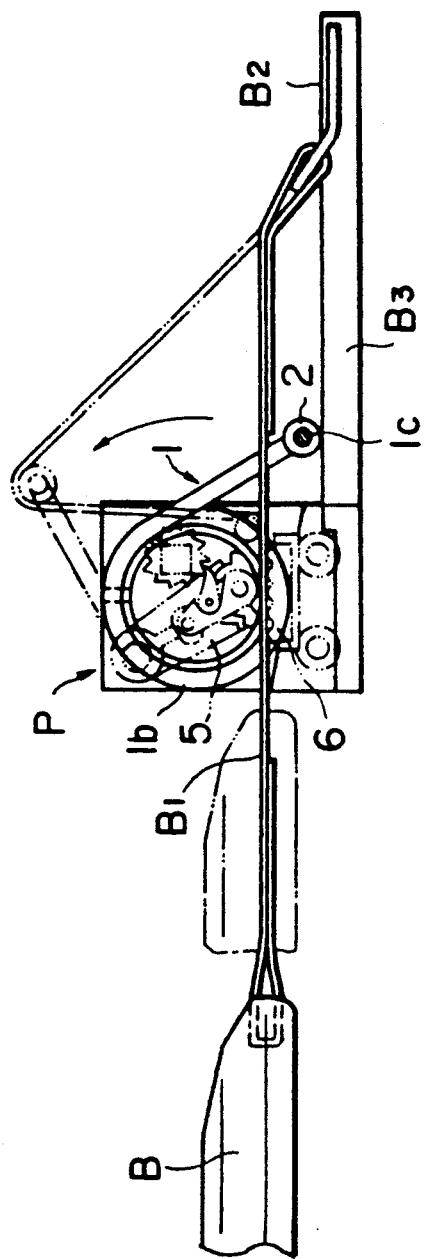
FIG. 6 is a side elevational view of the second embodiment.

The second embodiment of a pretensioner P, shown in FIGS. 5 and 6, is similar to the first embodiment, except that it is used to apply a pulling force to a buckle B by forming a loop in a length of webbing B1 that connects the buckle to an anchor B2. The pretensioner P and the anchor B2 are affixed to a base B3, which in turn is attached to the vehicle. A torsion coil spring 1 is suitably mounted on the base B adjacent each side of the webbing B1 with its base end portion 1a restrained, its coil portion 1b tightened to create a preload (store energy), and its operating end portion 1c received in a sleeve 2, which extends transversely across the webbing B1 between the base B3 and the webbing B1 and connects the operating end portions 1c of the two springs 1 together so that they act in tandem. Upon release of a trigger mechanism (not shown) the energy stored in the torsion coil springs 1 is released and transduced into rapid motion of the sleeve 2 along an arc indicated by the arrow in FIG. 6 to a position in which a loop (shown in phantom lines) is formed in a portion of the webbing B1 between the anchor B2 and a webbing guide bar. Accordingly, the buckle B is pulled toward the anchor, and an occupant restraint webbing (not shown) attached to the buckle by a buckle tongue is pretensioned. The pretension is maintained in the restraint webbing by engagement of the webbing B1 between a clamp lever 5 and a clamp jaw 6, which are actuated by a mechanism similar in principle to that shown in FIGS. 1 to 4 and described above. In most restraint belt systems, the buckle tongue is located between a lap portion and a shoulder portion of the restraint webbing, so that pulling the buckle toward the anchor tightens both the lap and shoulder portions of the restraint webbing.

Figure 7:
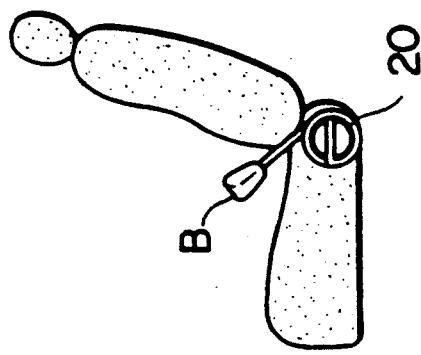
FIG. 7 is a side elevational view of a third embodiment.
Figure 8:
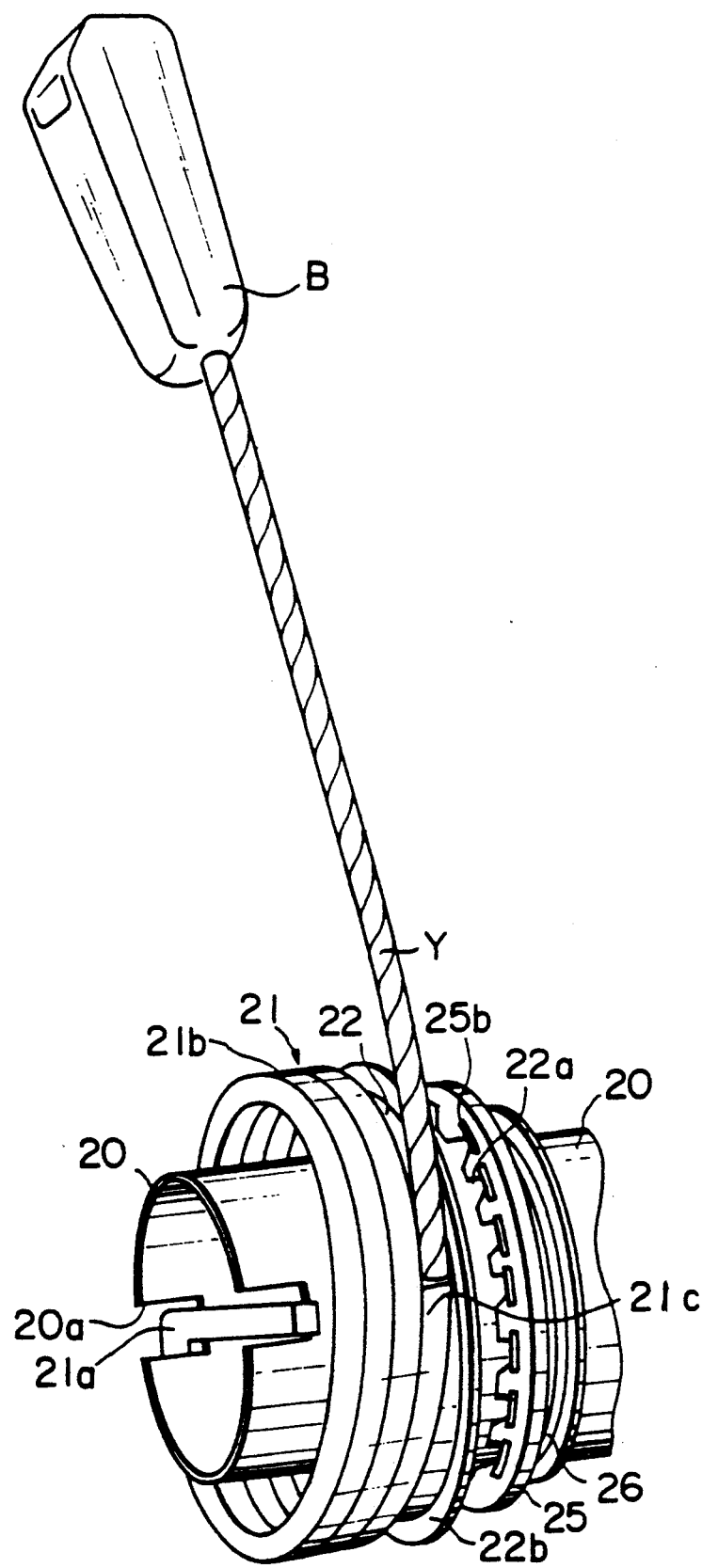
FIG. 8 is a three-quarter rear pictorial view of the third embodiment.
Figure 9:
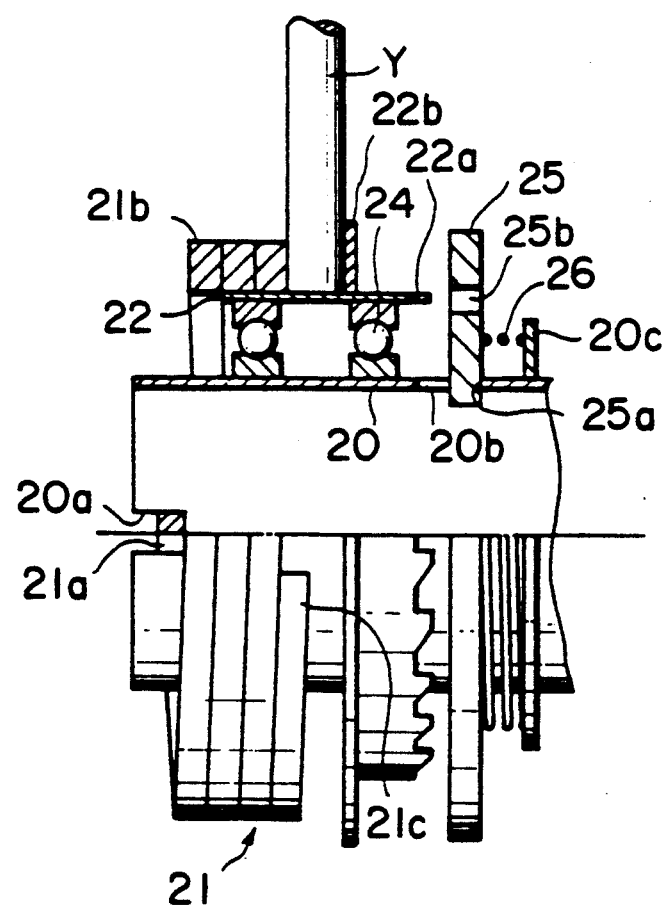
FIG. 9 is a rear half cross-sectional view of the third embodiment.

FIGS. 7 to 9 illustrate another embodiment in which the restraint webbing is tightened by displacing a buckle B. A shaft 20 projects out laterally from the lower rear portion of the inboard side of a vehicle seat (FIG. 7). The base end portion 21a of a torsion coil spring is received in a notch 20a in the end of the shaft 20 (FIG. 8) so that the coil portion 21b, which is received on the shaft, cannot rotate on the shaft except to the extent that it does so by tightening of the coils to store energy. The operating end portion 21c of the spring 21 is affixed to a mandrel 22 that is rotatably received on the shaft by means of a bearing 24. One end of a flexible cable Y is attached the mandrel and can be wound onto the mandrel when it is rotated in a suitable direction, a collar 22b being affixed to the mandrel to keep the cable from slipping off the mandrel during winding. The other end of the cable Y is connected to the buckle B. A row of ratchet latch teeth 22a project from one edge of the mandrel and are normally received in corresponding slots 25b in a latch ring 25 that is non-rotatably received on the mandrel by reception of one or more inwardly extending lugs 25a on the ring 25 in longitudinal guide slots in the 20b in the mandrel. The latch ring 25 is biased by a compression coil spring 26 received between it and a collar 20c affixed to the mandrel in a direction toward the mandrel, and a suitable trigger mechanism (not shown) normally holds the latch ring in a position such that the teeth 22a on the mandrel 22 are engaged in the slots 25b in the latch ring 25 and the mandrel cannot rotate.

When the trigger mechanism is actuated upon the sensing of a large acceleration of the vehicle, the latch ring 25 is no longer held in engagement with the mandrel 22 and is pushed out of engagement with the mandrel 22 by a camming action of the ratchet teeth 22a against the edges of the slots 25b as a result of the release of the stored energy of the torsion coil spring 21, which causes the mandrel to be rotated. Upon rotation of the mandrel, the cable 25 is wound onto the perimeter of the mandrel, thereby pulling the buckle in a direction to tighten the restraint webbing of the restraint belt system. Once the webbing has been pretensioned, the pretension is prevented from being released by re-engagement of the ratchet teeth 22a of the mandrel by the slots 25b in the latch ring 25, which is restored to the latching condition by the compression coil spring 26.

The third embodiment (FIGS. 7 to 9) has the advantage of exerting a pulling force on the buckle that acts in the same direction as the buckle moves in applying tension to the webbing, i.e, axially along the cable Y. Also, it is of a small size and can be readily located between the seats of the vehicle. Both the embodiments of FIGS. 5 and 6 and 7 to 9, when used in the most common types of belt systems, as described above, provide a well-balanced pretension of both the shoulder and lap portions of the restraint webbing.

Thus, the invention provides a pretensioner having numerous advantages, such as lower cost, compact size, the capability of being used in association with various elements of a belt system located in either the buckle side or the retractor side of the system and the ability to provide favorable force distribution, such as by using two springs, one on either side of a webbing. Because the motive power source is not exhausted after it is used, the possibility is presented of resetting it, which in turn makes it feasible to design the pretensioner to be triggered at low accelerations. On the one hand, the pretensioner may be used with a shoulder portion of the webbing, in which case pretension is applied mainly to the shoulder portion. On the other hand, well-balanced pretensioning of both the lap and shoulder portions of the restraint webbing can be attained by providing the pretensioner in association with the buckle of the system. In all cases, of course, the energy stored in the torsion coil springs can be established at a desired level through their design. The springs can, of course, have various cross-sections, it being advantageous to make them thicker in the radial direction than in the axial direction for enhanced compactness. Various mechanisms for triggering the pretensioner and holding the pretension can be provided.

The above-described embodiments of the invention are merely exemplary, and modifications and variations of the embodiments can be adopted without departing from the characteristics set forth in the claims.

We claim:

1. A pretensioner for a vehicle safety belt system for tightening a webbing that restrains a vehicle occupant by displacing an element of the belt system in a manner such as to tighten the webbing and including motive power means for displacing the element and trigger means for initiating operation of the motive power means, characterized in that the motive power means includes at least one torsion coil spring having a base end portion fixed to the vehicle; a soil portion retained in guided relation to the vehicle, and an operating end portion associated with the element such as to impart a driving force to the element to cause it to displace upon release of energy stored in the coil spring and in that the trigger means includes means for holding the operating end portion of the spring in a fixed position in which energy is stored in the spring and the operating end portion does not impart a driving force to the element and means for causing the holding means to release the operating end of the spring so that it imparts a driving force to the element.

2. A pretensioner according to claim 1 and further characterized in that the element of the belt system is a portion of a webbing.

3. A pretensioner according to claim 2 and further characterized in that the coil portion of the coil spring has an axis and is positioned laterally adjacent said webbing portion with its axis disposed substantially crosswise with respect to the webbing portion.

4. A pretensioner according to claim 3 and further characterized in that the motive power means includes two coil springs, one having its coil portion positioned on one side of the webbing portion and the other having its coil portion positioned on the other side of the webbing portion.

5. A pretensioner according to claim 4 and further characterized in that the operating end portion of the two coil springs are connected to each other.

6. A pretensioner according to claim 1 and further characterized in that the element of the belt system is a buckle that connects a portion of the webbing to the vehicle.

7. A pretensioner according to claim 6 and further characterized in that a mandrel is rotatably supported on the vehicle, in that the buckle is connected to the mandrel by a flexible member, and in that the operating end portion of the coil spring is connected to the mandrel such as to rotate it upon release of the energy stored in the coil spring and wind the flexible member onto the mandrel, whereby the buckle is displaced to tighten the webbing.

8. A pretensioner according to any one of the preceding claims 7 and further characterized in that the coil portion of the coil spring has a transverse cross-section in which with respect to the coil axis the radial thickness is substantially greater than the axial width.

* * * * *